United States Patent
Mese et al.

(10) Patent No.: US 10,147,426 B1
(45) Date of Patent: Dec. 4, 2018

(54) METHOD AND DEVICE TO SELECT AN AUDIO OUTPUT CIRCUIT BASED ON PRIORITY ATTRIBUTES

(71) Applicant: Lenovo (Singapore) Pte. Ltd., New Tech Park (SG)

(72) Inventors: John Carl Mese, Cary, NC (US); Russell Speight VanBlon, Raleigh, NC (US); Nathan J. Peterson, Oxford, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/665,786

(22) Filed: Aug. 1, 2017

(51) Int. Cl.
  *G10L 15/22* (2006.01)
  *H04S 7/00* (2006.01)
  *G10L 15/28* (2013.01)
  *G10L 15/01* (2013.01)
  *G10L 15/02* (2006.01)
  *G10L 15/26* (2006.01)

(52) U.S. Cl.
  CPC .............. *G10L 15/22* (2013.01); *G10L 15/01* (2013.01); *G10L 15/02* (2013.01); *G10L 15/265* (2013.01); *G10L 15/285* (2013.01); *H04S 7/301* (2013.01); *G10L 2015/223* (2013.01); *G10L 2015/225* (2013.01)

(58) Field of Classification Search
  CPC .................. H04R 5/02; H04R 2420/07; H04R 2205/024; H04W 12/04; H04S 7/30
  USPC ...................... 381/110, 80, 334, 74, 311, 300
  See application file for complete search history.

(56) References Cited

U.S. PATENT DOCUMENTS

| | | | |
|---|---|---|---|
| 9,479,931 B2 | 10/2016 | Ortiz, Jr. et al. | |
| 9,607,612 B2 | 3/2017 | Deleeuw | |
| 9,652,279 B1 | 5/2017 | Scott et al. | |
| 2008/0270224 A1* | 10/2008 | Portman | G06F 17/30867 455/456.3 |
| 2010/0197229 A1* | 8/2010 | Yamashita | H04W 76/15 455/41.2 |
| 2012/0054613 A1* | 3/2012 | Yoo | G06F 3/165 715/716 |
| 2013/0279744 A1* | 10/2013 | Ingrassia, Jr. | G06F 21/32 382/103 |
| 2015/0264474 A1* | 9/2015 | Seo | H04R 1/1091 381/74 |
| 2016/0073197 A1* | 3/2016 | Hammer | H04W 12/04 381/80 |
| 2016/0255398 A1* | 9/2016 | Lee | H04N 21/8106 348/462 |
| 2016/0378747 A1 | 12/2016 | Orr et al. | |

* cited by examiner

*Primary Examiner* — Melur Ramakrishnaiah
(74) *Attorney, Agent, or Firm* — Dean D. Small; The Small Patent Law Group, LLC

(57) ABSTRACT

A computer implemented method, device and computer program device are provided that are under the control of one or more processors having instructions. The method, device, and system obtain audio content based on a user request, identify a priority attribute associated with the user request, and identify a plurality of audio output circuits. The method, device, and system select at least one of the audio output circuits based on the priority attribute and communicate the audio content to the at least one of the audio output circuits selected.

20 Claims, 3 Drawing Sheets

METHOD AND DEVICE TO SELECT AN AUDIO OUTPUT CIRCUIT BASED ON PRIORITY ATTRIBUTES

BACKGROUND

Embodiments herein generally relate to methods and devices for selecting an audio output circuit based on priority attributes.

A digital personal assistant (DPA) is a user interface for an electronic device. The DPA simulates human traits allows a human user to interact with the electronic device in a manner similar to interacting with another person, rather than a machine. For example, the DPA may include a voice recognition system that interprets the voice input of the user and executes services or perform tasks in response thereto. The DPA also includes a voice interface to audibly respond to the user in a natural language form.

Generally, a DPA operates on a single device with dedicated components to interact with the user. For example, a DPA may have a built-in microphone to receive user requests and a built-in speaker to provide audio contents. However, built-in speakers for DPAs are typically small and low quality when compared to other home audio devices, such as home stereos or larger wireless speakers. Therefore, the DPA may also include a component interface that can connect to a wired or wireless external speaker to replace the built-in speaker as the default audio output.

Users often own multiple audio devices that can be used for different types of audio and/or at different locations. For example, a user may own a home theater audio system for listening to television and movie audio content, a smaller tabletop speaker for listening to music, and an outdoor speaker for listening to audio content outdoors. When multiple audio devices are available, it may be desirable to listen to one type of audio content on one device, but listen to another type of audio content on a different device. For example, when a user requests the DPA to provide information via the voice interface, such as weather information, the built-in speakers may be adequate to provide the audio content. However, when the user requests the DPA perform a task that involves longer or more complicated audio content, such as playing music or streaming audio, the user may prefer to listen to the audio content on a larger external speaker or system. In addition, when the user makes multiple requests that involve different types of audio content, the user may prefer that each type of audio content play on a preferred audio output circuit based on various priority attributes.

Accordingly, a need remains for methods and devices that select an audio output circuit based on priority attributes.

SUMMARY

In accordance with embodiments herein, a method is provided. The method is under control of one or more processors configured with executable instructions to obtain audio content based on a user request, identify a priority attribute associated with the user request; identify a plurality of audio output circuits, select at least one of the audio output circuits based on the priority attribute and communicate the audio content to the at least one of the audio output circuits selected.

Optionally, the method may determine the priority attribute based on an output length of the audio content. The method may determine the priority attribute based on one or more of a user history, a time or a date. The method may determine the priority attribute based on status conditions of the audio output circuits. The method may determine a priority list of the audio output circuits based on the priority attribute, and selecting a priority audio output circuit from the priority list based on the priority attribute. The method may determine the priority attribute based on a presence of non-users within a predetermined range of a base device. The method may analyze the user request with a voice recognition application.

In accordance with embodiments herein, an electronic device is provided comprising a processor, a user interface, and a data storage device having executable instructions accessible by the processor. Responsive to execution of the instructions, the processor receives a user request through the user interface, obtains audio content based on the user request, identifies a priority attribute associated with the user request, identifies a plurality of audio output circuits, selects at least one of the audio output circuits based on the priority attribute; and communicates the audio content from the device to the at least one of the audio output circuits.

Optionally, the electronic device may determine the priority attribute based on an output length of the audio content. The electronic device may determine the priority attribute based on a user history. The electric device may determine the priority attribute based on a status condition of the audio output circuits. The electronic device may determine a priority list of the audio output circuits based on the priority attribute, and select a priority audio output circuit from the priority list based on the priority attribute. The electronic device may determine the priority attribute based on a presence of non-users within a predetermined range of the device. The electronic device may analyze the user request with a voice recognition application.

In accordance with embodiments herein, a non-signal readable data storage device comprising executable code to. receive a user request through a user interface of a base device, obtain an audio content based on the user request, identify a priority attribute associated with the user request, identify a plurality of audio output circuits, select at least one of the audio output circuits based on the priority attribute; and communicate the audio content from the device to the at least one of the audio output circuits.

Optionally, the non-readable data storage device may comprise executable code to determine the priority attribute based on an output length of the audio content. The non-signal readable data storage device may comprise executable code to determine the priority attribute based on one or more of a user history, a time, or a date. The non-signal readable data storage device may comprise executable code to determine the priority attribute based on a status condition of the audio output circuits. The non-signal readable data storage device may comprise executable code to determine a priority list of the audio output circuits based on the priority attribute and select a priority audio output circuit from the priority list based on the priority attribute. The non-signal readable data storage device may comprise executable code to determine the priority attribute based on a presence of non-users within a predetermined range of a base device.

DETAILED DESCRIPTION

Figure 1:
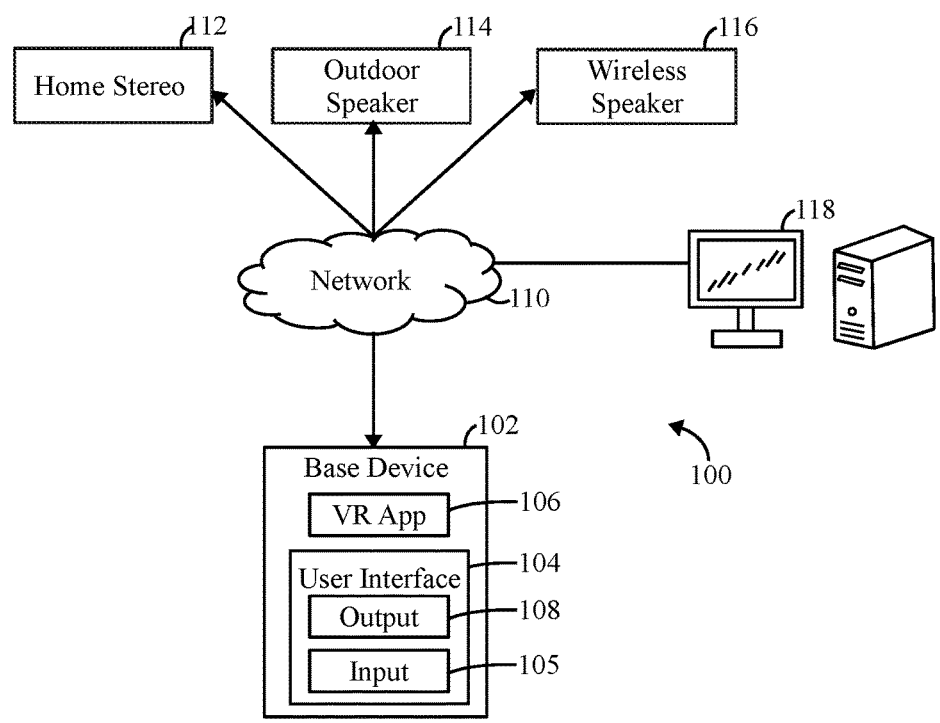
FIG. 1 illustrates a system for selecting an audio output circuit based on priority attributes in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "digital personal assistant", "virtual assistant", "intelligent digital assistant", as used throughout, shall generally refer to any user interface or information processing system that uses a voice recognition system, such as a Natural language understanding (NLU), automatic speech recognition (ASR), or text-to-speech synthesis (TTS), to interpret natural language input in spoken form and/or textual form to infer intent, and perform actions based on an inferred user intent. For example, a digital personal assistant may receive a user request in the form of a natural language command, request, statement, narrative, and/or inquiry. A user request may seek either an informational answer or performance of a task by the digital personal assistant. Accordingly, the digital personal assistant can perform the requested task and/or provide responses in audio and/or visual form, such as natural language, music, video, text, animations, etc.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

FIG. 1 illustrates a system 100 for selecting an audio output circuit based on priority attributes in accordance with embodiments herein. The system 100 includes a base device 102 with a user interface 104 having an input circuit 105 for a user to submit user requests using a voice recognition (VR) application 106 and an output 108 to output audio contents responsive to the user requests. A network 110 operatively connects the base device 102 to one or more audio output circuits 112, 114, 116, and network resources 118. Based on a set of priority attributes, the base device 102 determines a priority list of the audio output circuits 108, 112, 114, 116, selects one or more (prioritized) audio output circuits from the list, and communicates the audio content to the selected one or more (prioritized) audio output circuit.

By way of example, the base device 102 may be a digital personal assistant (e.g. the Amazon Echo device, Google Home device, etc.) or other electronic device that includes a voice recognition type user interface 104 and is configured to access the network 110 over a wired or wireless connection. As non-limiting examples, the base device 102 may access the network 110 through a wireless communications channel and/or through a network connection (e.g. the Internet). Additionally or alternatively, the base device 102 may be a wired or wireless communication terminal, such as a desktop computer, laptop computer, network-ready television, set-top box, and the like.

Each audio output circuit 112, 114, 116 may represent the same or different type of device as the base device 102, such as a speaker, stereo, home theatre system, computer, mobile phone, television, audio content player, smart watch, and the like. The base device communicates audio to one or more chosen audio output circuits over the network 110, and/or over a separated wired or wireless link therebetween. For example, an auxiliary output may be used to form a wired connection. Optionally, a Bluetooth link or other wireless link may for a direct connection wirelessly.

The base device 102 is configured to access the network resources 118, including web-based or network-based data, applications, and services, via the network 110. The network 110 may represent one or more of a local area network (LAN), a wide area network (WAN), an Intranet or other private network that may not be accessible by the general public, or a global network, such as the Internet or other publicly accessible network. The network 110 provides communication between the base device 102 and one or more network resources 118. It will be understood that, in some embodiments, the network resources 118 may represent a single entity or one or more physical or virtual servers that are configured to deliver online resources to the base device 102. Examples of the network resources 118 include, but are not limited to, web-based or network-based data storage services, social networking applications, shopping services, payment services, multimedia content delivery services, financial services and the like. The resources 118 may represent a Web service or a network service for an e-commerce business, financial institution, or any other commercial, noncommercial, personal, nonprofit or other entity.

Figure 2:
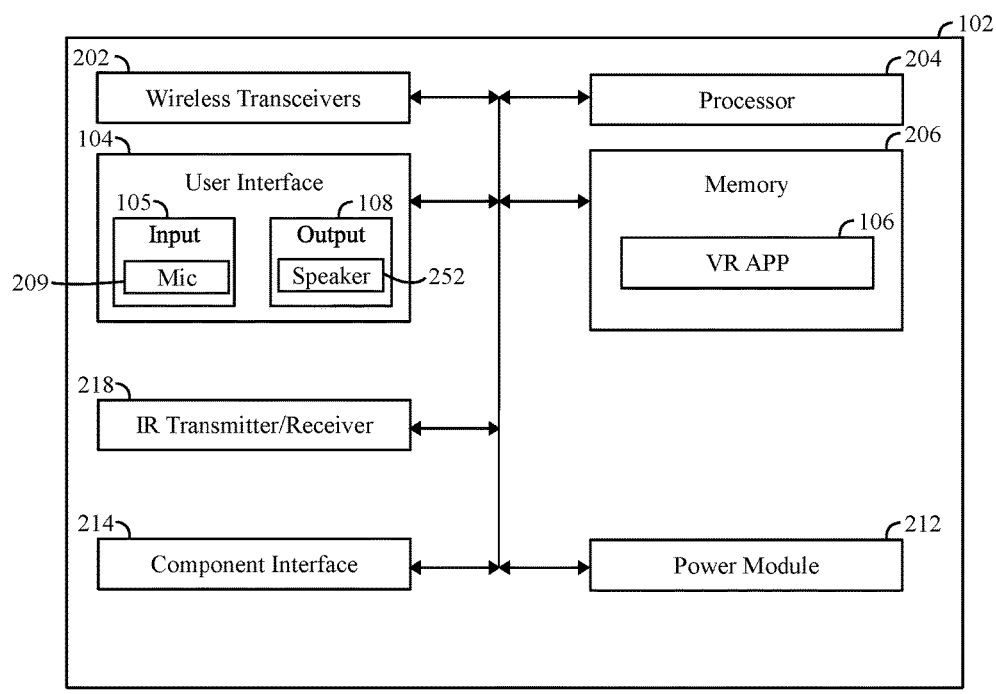
FIG. 2 illustrates a simplified block diagram of a base device of FIG. 1 in accordance with an embodiment.

FIG. 2 illustrates a simplified block diagram of the base device 102 of FIG. 1 in accordance with an embodiment. The base device 102 includes components such as one or more wireless transceivers 202, one or more processors 204 (e.g., a microprocessor, microcomputer, application-specific integrated circuit, etc.), one or more local storage medium (also referred to as a memory portion) 206, the user interface 104 which includes one or more input circuits 105 and one or more output circuits 108, a power module 212, a component interface 214, and an infrared (IR) transmitter/receiver 218. All of these components can be operatively coupled to one another, and can be in communication with one another, by way of one or more internal communication links, such as an internal bus.

The user interface 104 permits the user to operate the base device 102 for any of its intended purposes, such as administering the VR application 106, operating software applications, electronic communication, listening to audio media, and the like. The input circuit 105 can include one or more audio input circuits, such as a microphone 209, that is configured to receive audio input or requests from the user. The output circuit 210 can include one or more audio output circuits, such as a speaker 252, that are configured to communicate audio output or audio contents to the user. In association with the VR application 106, the user interface 104 allows the user to communicate with the base device 102 by receiving audio input in the form of natural language. The VR application 106 interprets the audio input received by the input circuit 105 and generates an audio content, such as a voice interface to audibly respond to the user in a natural language form.

Optionally, the input and output circuits 105, 108 may each include a variety of visual, audio, and/or mechanical devices. For example, the input circuit 105 can include a mechanical input circuit such as a keyboard, keypad, selection hard and/or soft buttons, switch, touchpad, touch screen, icons on a touch screen, a touch sensitive areas on a touch sensitive screen and/or any combination thereof. Similarly, the output circuit 108 can include a visual output circuit such as a liquid crystal display screen, touch sensitive screen, a non-touch sensitive screen, a text-only display, a smart phone display, an audio output (e.g., a speaker or headphone jack), and/or any combination thereof and/or one or more light emitting diode indicators. The output circuit 108 is integral to (e.g., within a common housing) the base device 102.

The memory 206 can encompass one or more memory devices of any of a variety of forms (e.g., read only memory, random access memory, static random access memory, dynamic random access memory, etc.) and can be used by the processor 204 to store and retrieve data. The data that is stored by the memory 206 can include, but need not be limited to, operating systems, applications, user collected content, and informational data. Each operating system includes executable code that controls basic functions of the device, such as interaction among the various components, communication with external devices via the wireless transceivers 202, the component interface 214, and/or the IR transmitter/receiver 218, and storage and retrieval of applications and data to and from the memory 206. Each application includes executable code that utilizes an operating system to provide more specific functionality for the communication devices, such as file system service and handling of protected and unprotected data stored in the memory 206.

The memory 206 stores various content including, but not limited to, the VR application 106 and priority attributes. The VR application 106 manages one or more operations of the base device 102. The VR application 106 includes instructions accessible by the one or more processors 204 to direct the processor 204 to implement the methods, processes and operations described herein including, but not limited to, the methods, processes and operations illustrated in the Figures and described in connection with the Figures. In an alternative embodiment, the VR application 106 may operate from one or more storage medium (also referred to as cloud storage).

Among other things, the VR application 106 manages operation of the processor 204 in association with receiving user requests and outputting audio contents to the audio output circuits 108, 112, 114, 116. In accordance with the embodiment of FIG. 2, the processor 204 directs the input circuit 105 of the user interface 104 to receive a user request. The processor 204 analyzes the user request and generates an audio content. Optionally, the processor 204 directs the transceiver 202 to access the network resources 118 through the network 110 in connection with generating the audio content. The processor 204 identifies priority attributes associated with the user request, including but not limited to the length of the audio content, a user history of device usage, a status of the audio output circuits, a time and/or date, and a presence of non-users in a predetermined range. The processor 204 identifies audio output circuits 108, 112, 114, 116 operatively connected to the base device 102. Based on the identification of priority attributes, the processor 204 determines a priority list of the audio output circuits 108, 112, 114, 116 for communicating the audio content.

Figure 3:
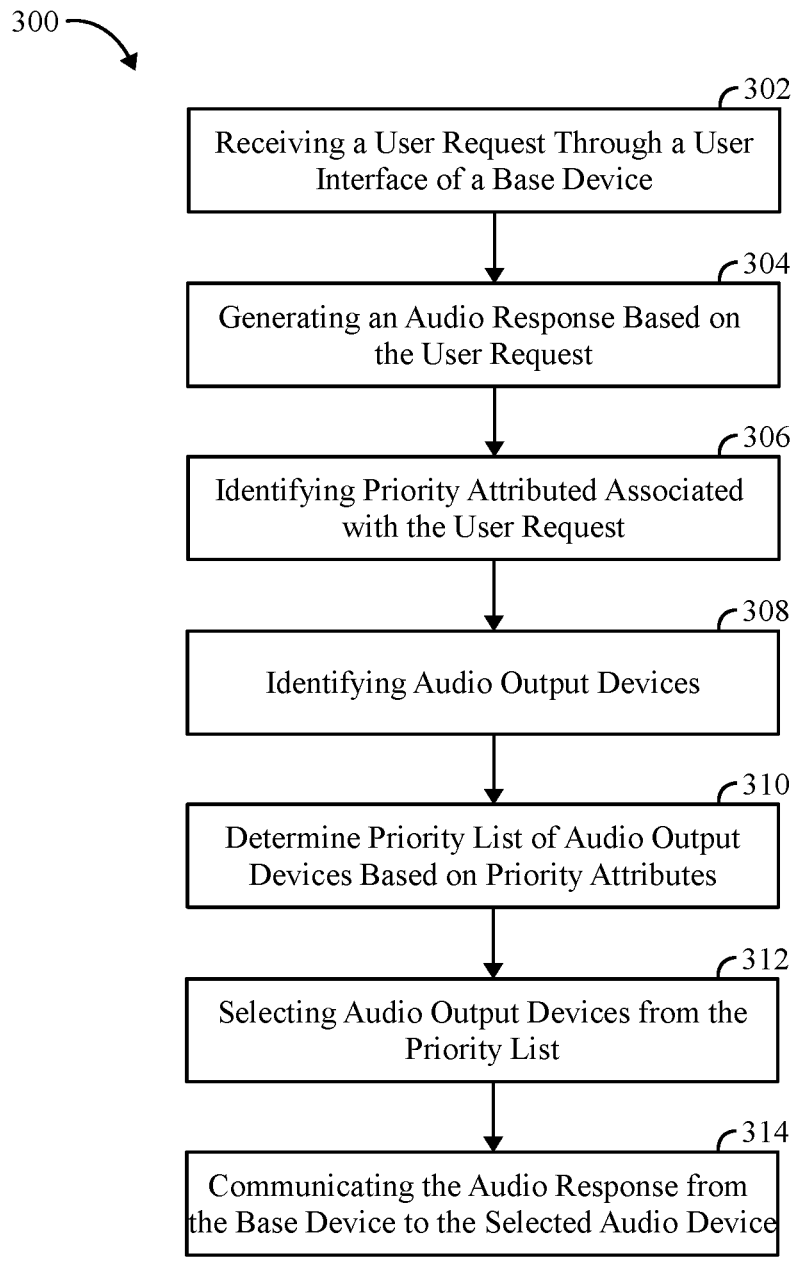
FIG. 3 illustrates a process for selecting an audio output circuit based on priority attributes in accordance with embodiments herein.

FIG. 3 illustrates a process 300 for selecting an audio output circuit based on priority attributes in accordance with embodiments herein. The operations of FIG. 3 are carried out by the one or more processors 204 of the base device 102 in response to execution of instructions such as in the VR application 106 and/or other applications stored in the memory 206.

At 302, the base device 102 receives a user request through the input circuit 105 of the user interface 104. The user request can be in the form of natural language, request, statement, narrative, and/or inquiry. The user request can seek an informational answer or performance of a task. For example, the user can submit a user request for information by asking the question, "What is the weather today?". The user can also submit a user request for performance of a task, for example, by stating, "Play my favorite song."

At 304, the processor 204 generates an audio content based on the user request. Based on information available in the memory 206 and/or through the network 110 from the network resources 118, the processor 304 can output an informational answer in the form of natural language audio content or by performing a task. For example, the processor 204 can generate an audio content that recites current weather conditions based on a user request. The processor 204 can also generate an audio content that plays a requested song based on a user request.

At 306, the processor 204 identifies priority attributes associated with the user request. The priority attributes can include any parameter to determine the order of priority of the audio output circuits 108, 112, 114, 116 to communicate the audio content to the user. For example, the priority attribute may be the length of the audio content. The priority attribute may also be a user history of usage patterns for an associated user. For example, the user history may indicate that the associated user primarily makes user requests for music. The processor 204 can update the user history on a periodic basis, such as after each user request. Optionally, the user history may retain user device usage patterns for multiple associated users, such as a parent and a child. Additionally or alternatively, the priority attribute may include a status condition of each audio output circuit 108, 112, 114, 116. For example, the processor 204 can direct the transceiver 202 to transmit a status condition request and listen for responses from audio output circuits 108, 112, 114, 116. The processor 204 can analyze responsive status condition data to obtain information indicative of the status of each audio output circuit, such as on, off, over-heated or standby. Optionally, the processor 204 can send a signal to one of the audio output circuits 108, 112, 114, 116 to change the status. In another example, the priority attribute may include a time or date. In yet another example, the priority attribute may include the presence of non-users within a predetermined range. For example, the base device 102 can use visual devices motion sensors, wireless tracking devices and the like to determine that non-users are present within the same room as the user. Audio content may be directed to different audio output circuits when non-users are present or absent. In one illustrative embodiment, the user may be a parent that requests the base device 102 play audio containing mature content. The non-user may be a child determined to be present in the same room as the parent. Accordingly, the audio content may be directed to an audio device only accessible by the parent, such as headphones, to prevent the child from hearing the mature audio content.

At 308, the processor 204 identifies the availability of audio output circuits 108, 112, 114, 116. For example, the processor 204 can direct the transceiver 202 to transmit an availability inquiry request and listen for responses from the audio output circuits 108, 112, 114, 116. The processor 204 analyzes availability data from the responses to obtain information indicative of the availability of each audio output circuit. Optionally, the processor 204 analyzes data from the responses to obtain additional information about each audio device, such as the manufacturer, make, model, version of the device.

At 310, the processor 204 determines a priority list of the audio output circuits 108, 112, 114, 116 based on at least one of the priority attributes. For example, a priority attribute that indicates that the audio content is short, such as a statement of time of day, may raise the priority of the speaker 252 of the base device 102. In contrast, if the priority attribute indicates the audio content is long, such as a song, the priority of one of the audio output circuits, such as the home stereo 112, may raise in priority. In another example, a priority attribute that indicates that the user has a history of making user requests that play audio content on a specific audio output circuit, such as music on the home stereo 112, then the priority of the home stereo 112 may be raised. If the priority attribute indicates that one or more of the audio circuits 108, 112, 114, 116 have a status of off, the priority of the devices may be lowered. If the priority attribute indicates that non-users are present in a particular location, such as in the same room as the user, the priority of the devices may be raised or lowered. For example, the priority of a home stereo device may be lowered, and the priority of a headphone device may be raised. If the priority attribute indicates a time of day or date, the priority of the devices may be raised or lowered. For example, if the priority attribute indicates a time of 7 pm on a Saturday in July, the priority of devices near the outdoor pool may be raised, and the priority of other devices lowered.

At 312, the processor 204 selects the prioritized audio output circuit from the priority list. For example, the processor 204 can select the audio output circuit 108, 112, 114, 116 that is determined to be the highest priority on the priority list. Alternatively, the processor can select the audio output circuit 108, 112, 114, 116 that is determined to be a different priority on the priority list, such as the second highest priority. For example, the priority list may indicate that the home stereo system is the highest priority audio output circuit, but due to mature content contained within the audio content, select a lower priority on the list, such as headphones.

At 314, the base device 102 communicates the audio content to the selected audio output circuit over one or more wired or wireless medium, such as the transceiver 202, and/or the IR transmitter/receiver 218. The content and nature of the audio content may vary based on various factors. For example, the requests, responses and audio content may be conveyed in accordance with a Bluetooth protocol. Optionally, the responses and audio content may be conveyed in accordance with various wireless protocols, such as 802.11, wireless local area network (WLAN), Wi-Fi protected access (WPA), wired equivalent privacy (WEP), Wi-Fi, wireless broadband and the like. As other examples, the responses may be conveyed in accordance with various communications protocols, such as a hypertext transfer protocol (HTTP), Internet relay chat (IRC) and the like.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
   under control of one or more processors configured with executable instructions;
   receiving a user request in the form of one or more of a natural language statement, narrative, inquiry, request for an informational answer, and request for performance of a task;
   obtaining audio content based on the user request;
   identifying a priority attribute from one or more of the audio content and the user request;
   identifying a plurality of audio output circuits;
   selecting at least one of the audio output circuits based on the priority attribute; and
   communicating the audio content to the at least one of the audio output circuits selected.

2. The method of claim 1, further comprising determining the priority attribute based the audio content.

3. The method of claim 1, further comprising determining the priority attribute based on one or more of a user history, a time or a date.

4. The method of claim 1, further comprising determining the priority attribute based on status conditions of the audio output circuits.

5. The method of claim 1, further comprising determining a priority list of the audio output circuits based on the priority attribute, and selecting a priority audio output circuit from the priority list based on the priority attribute.

6. The method of claim 1, further comprising determining the priority attribute based on a presence of non-users within a predetermined range of a base device.

7. The method of claim 1, further comprising analyzing the user request with a voice recognition application.

8. An electronic device, comprising:
   a processor;
   a user interface;
   a data storage device having executable instructions accessible by the processor;
   wherein, responsive to execution of the instructions, the processor:
   receive a user request through the user interface, the user request in the form of one or more of a natural language statement, narrative, inquiry, request for an informational answer, or request for performance of a task;
   obtains audio content based on the user request;
   identifies a priority attribute from one or more of the audio content and the user request;
   identifies a plurality of audio output circuits;
   selects at least one of the audio output circuits based on the priority attribute; and
   communicates the audio content from the device to the at least one of the audio output circuits.

9. The device of claim 8, wherein the executable instructions are executable by the processor to determine the priority attribute based on the audio content.

10. The device of claim 8, wherein the executable instructions are executable by the processor to determine the priority attribute based on a user history.

11. The device of claim 8, wherein the executable instructions are executable by the processor to determine the priority attribute based on a status condition of the audio output circuits.

12. The device of claim 8, wherein the executable instructions are executable by the processor to determine a priority list of the audio output circuits based on the priority attribute, and select a priority audio output circuit from the priority list based on the priority attribute.

13. The device of claim 8, wherein the executable instructions are executable by the processor to determine the priority attribute based on a presence of non-users within a predetermined range of the device.

14. The device of claim 8, wherein the executable instructions are executable by the processor to analyze the user request with a voice recognition application.

15. A non-signal readable data storage device comprising executable code to:
- receive a user request through a user interface of a base device, the user request representing one or more of a natural language statement, narrative, inquiry, request for an informational answer, or request for performance of a task;
- obtains an audio content based on the user request;
- identify a priority attribute from one or more of the audio content and the user request;
- identify a plurality of audio output circuits;
- select at least one of the audio output circuits based on the priority attribute; and
- communicate the audio content from the device to the at least one of the audio output circuits.

16. The non-signal readable data storage device comprising executable code of claim 15, further comprising executable code to determine the priority attribute based on the audio content.

17. The non-signal readable data storage device comprising executable code of claim 15, further comprising executable code to determine the priority attribute based on one or more of a user history, a time, or a date.

18. The non-signal readable data storage device comprising executable code of claim 15, further comprising executable code to determine the priority attribute based on a status condition of the audio output circuits.

19. The non-signal readable data storage device comprising executable code of claim 15, further comprising executable code to determine a priority list of the audio output circuits based on the priority attribute and select a priority audio output circuit from the priority list based on the priority attribute.

20. The non-signal readable data storage device comprising executable code of claim 15, further comprising executable code to determine the priority attribute based on a presence of non-users within a predetermined range of a base device.

* * * * *